(12) United States Patent
Sawahashi et al.

(10) Patent No.: US 11,089,440 B1
(45) Date of Patent: Aug. 10, 2021

(54) MANAGEMENT OF GEOGRAPHICALLY AND TEMPORARILY DISTRIBUTED SERVICES

(71) Applicant: International Business Machines Corporation, Armonk, NY (US)

(72) Inventors: Matsuo Sawahashi, Chiba (JP); Takashi Yanagisawa, Setagaya-ku (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/805,976

(22) Filed: Mar. 2, 2020

(51) Int. Cl.
| | |
|---|---|
| *H04W 4/029* | (2018.01) |
| *H04W 4/50* | (2018.01) |
| *G06Q 50/30* | (2012.01) |
| *G06N 7/00* | (2006.01) |
| *G06Q 10/02* | (2012.01) |
| *H04W 4/42* | (2018.01) |
| *H04L 29/08* | (2006.01) |

(52) U.S. Cl.
CPC .......... *H04W 4/029* (2018.02); *G06N 7/005* (2013.01); *G06Q 10/02* (2013.01); *G06Q 50/30* (2013.01); *H04L 67/18* (2013.01); *H04W 4/42* (2018.02); *H04W 4/50* (2018.02)

(58) Field of Classification Search
CPC ......... H04W 4/029; H04W 4/50; H04W 4/42; G06Q 10/02; G06Q 50/30; H04L 67/18; G06N 7/005
USPC .................... 455/99, 152.1, 297, 345, 414.1, 455/456.1–457, 569.2, 575.9
See application file for complete search history.

(56) References Cited

U.S. PATENT DOCUMENTS

| | | | |
|---|---|---|---|
| 10,248,913 B1* | 4/2019 | Gururajan | G06Q 50/30 |
| 2008/0195428 A1* | 8/2008 | O'Sullivan | G06Q 10/00 |
| | | | 705/6 |
| 2008/0270019 A1* | 10/2008 | Anderson | G01C 21/3438 |
| | | | 701/533 |

(Continued)

FOREIGN PATENT DOCUMENTS

| | | |
|---|---|---|
| CN | 108320495 A | 7/2018 |
| JP | 07242940 A | 9/1995 |

(Continued)

OTHER PUBLICATIONS

Mell et al., "The NIST Definition of Cloud Computing," Recommendations of the National Institute of Standards and Technology, U. S. Department of Commerce, Special Publication 800-145, Sep. 2011, 7 pages.

*Primary Examiner* — Michael Y Mapa
(74) *Attorney, Agent, or Firm* — Grant Johnson

(57) ABSTRACT

A computer-implemented scheduling method, a base unit for a reservation management system, and a computer program product for computerized reservation management. One method may comprise acquiring a plurality of temporary reservations from a plurality of customers, calculating a resource usage probability function for each of the plurality of customers using the probability functions associated with the plurality of temporary reservations, matching the plurality of customers with a plurality of mobile resources based on the calculated resource usage probability functions, and dispatching one of the plurality of mobile resources to a pickup location in response to the matching. The plurality of temporary reservations may include probability functions.

9 Claims, 8 Drawing Sheets

(56) References Cited

U.S. PATENT DOCUMENTS

| | | | | |
|---|---|---|---|---|
| 2016/0117610 A1* | 4/2016 | Ikeda | ...................... | G06Q 10/02 |
| | | | | 705/5 |
| 2016/0314791 A1 | 10/2016 | Wang et al. | | |
| 2019/0171988 A1 | 6/2019 | Kwatra et al. | | |
| 2019/0204992 A1* | 7/2019 | Bowden | ............. | G01C 21/3438 |
| 2019/0206008 A1* | 7/2019 | Dutta | ...................... | G06N 7/005 |

FOREIGN PATENT DOCUMENTS

| | | |
|---|---|---|
| JP | 11118991 A | 4/1999 |
| JP | 2001014296 A | 1/2001 |
| JP | 2001362435 A | 7/2002 |
| JP | 2002209169 A | 7/2002 |
| JP | 2003121409 A | 4/2003 |
| JP | 2005130335 A | 5/2005 |
| JP | 2006018802 A | 1/2006 |
| JP | 2006237423 A | 9/2006 |
| JP | 2014508481 A | 4/2014 |
| JP | 2017522519 A | 8/2017 |
| WO | 2012148904 A1 | 11/2012 |
| WO | 2016081170 A1 | 5/2016 |
| WO | 2019135858 A1 | 7/2019 |

\* cited by examiner

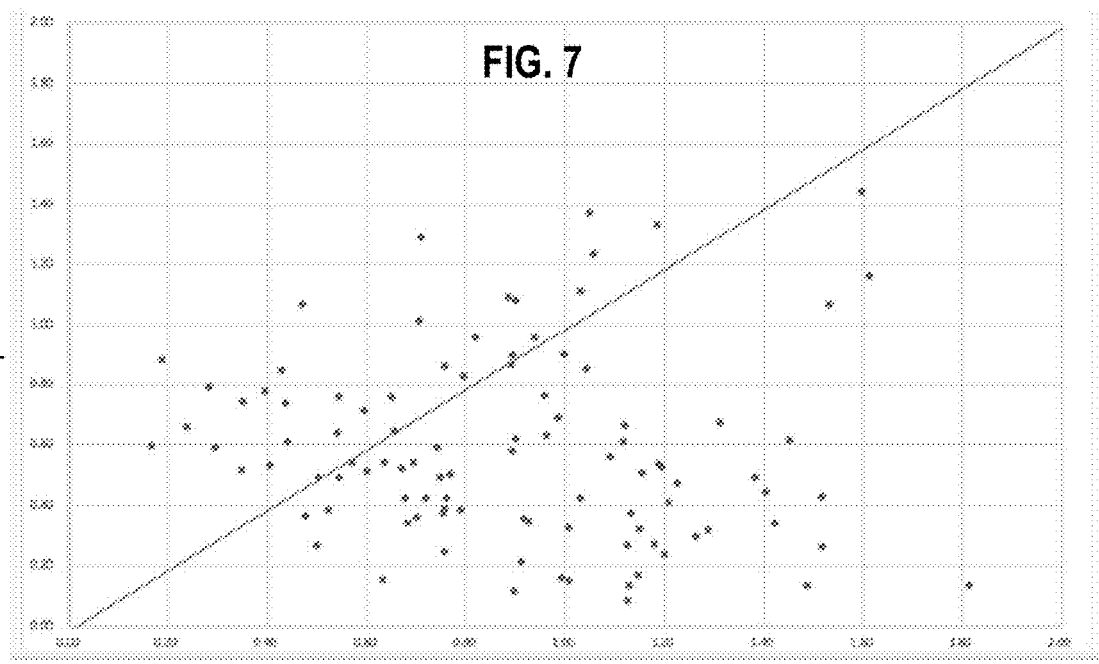
Taxi allocation distance according to pattern 1
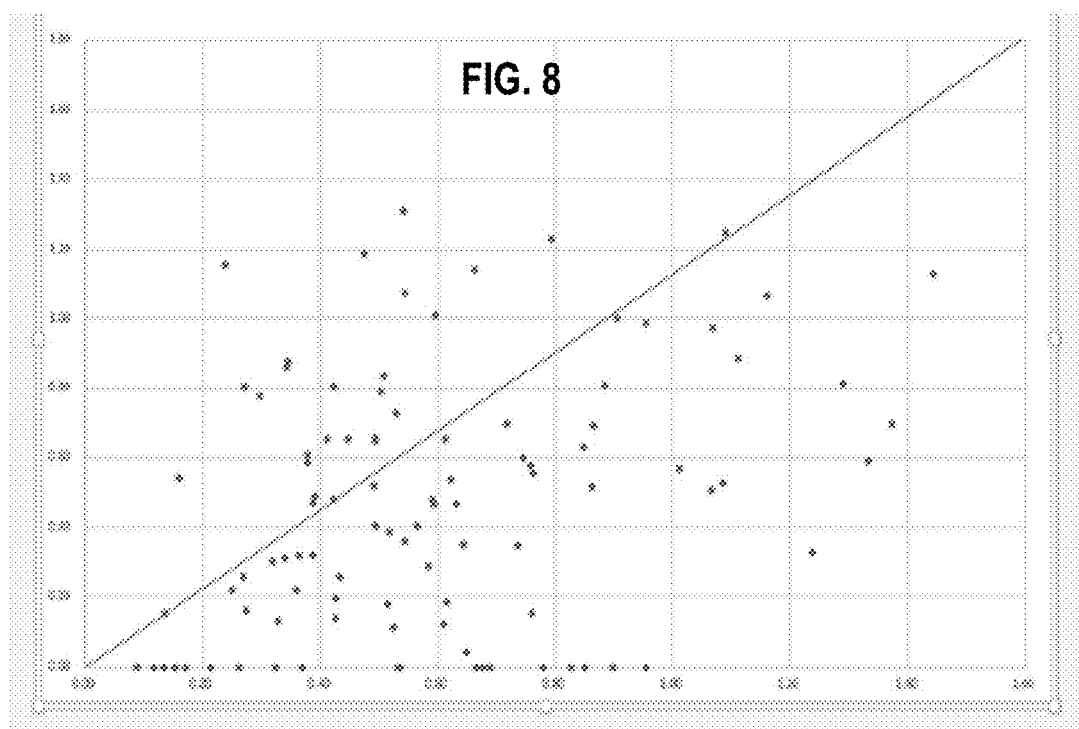
Taxi allocation distance according to pattern 2

MANAGEMENT OF GEOGRAPHICALLY AND TEMPORARILY DISTRIBUTED SERVICES

BACKGROUND

The present disclosure relates to reservation management systems, and more specifically, reservation management when customers are distributed geographically and have different service request times.

The development of the EDVAC computer system of 1948 is often cited as the beginning of the computer era. Since that time, computer systems have evolved into extremely complicated devices. Today's computer systems typically include a combination of sophisticated hardware and software components, application programs, operating systems, processors, buses, memory, input/output devices, and so on. As advances in semiconductor processing and computer architecture push the performance of the computer higher and higher, even more advanced computer software has evolved to take advantage of the higher performance of the hardware, resulting in computer systems today that are much more powerful than just a few years ago.

One of the first technical challenges to which computing systems were applied is the reservation management system (RMS). RMS generally refers to a computer system used to conduct transactions related to air travel, taxis, courier services, shipping services, rideshare matching programs, personalized rapid transit, car rental, rail travel, trailer rental, hotels, tours, and other activities.

SUMMARY

According to embodiments of the present disclosure, a computer-implemented scheduling method. The method may comprise acquiring a plurality of temporary reservations from a plurality of customers, calculating a resource usage probability function for each of the plurality of customers using the probability functions associated with the plurality of temporary reservations, matching the plurality of customers with a plurality of mobile resources based on the calculated resource usage probability functions, and dispatching one of the plurality of mobile resources to a pickup location in response to the matching. The plurality of temporary reservations may include probability functions.

According to embodiments of the present disclosure, a base unit for a reservation management system, comprising a processor coupled to a memory, the memory containing program instructions. When executed on the processor, the program instructions may cause the base unit to acquire a plurality of temporary reservation from a plurality of customers, calculate a resource usage probability function for each of the plurality of customers using the probability functions associated with the plurality of temporary reservations, match the plurality of customers with a plurality of mobile resources based on the calculated resource usage probability functions, and dispatch one of the plurality of mobile resources to a pickup location based on the matching. The plurality of temporary reservations may include probability functions.

According to embodiments of the present disclosure, a computer program product for computerized reservation management. The computer program product may comprise one or more computer readable storage media, and program instructions collectively stored on the one or more computer readable storage media. The program instructions may comprise program instructions to acquire a plurality of temporary reservation from a plurality of customers, program instructions to calculate a resource usage probability function for each of the plurality of customers using the probability functions associated with the plurality of temporary reservations, program instructions to match the plurality of customers with a plurality of mobile resources based on the calculated resource usage probability functions, and program instructions to dispatch one of the plurality of mobile resources to a pickup location based on the matching. The plurality of temporary reservations may include probability functions.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

FIGS. 7 and 8 illustrate the result of simulations of some embodiments.

Figure 1:
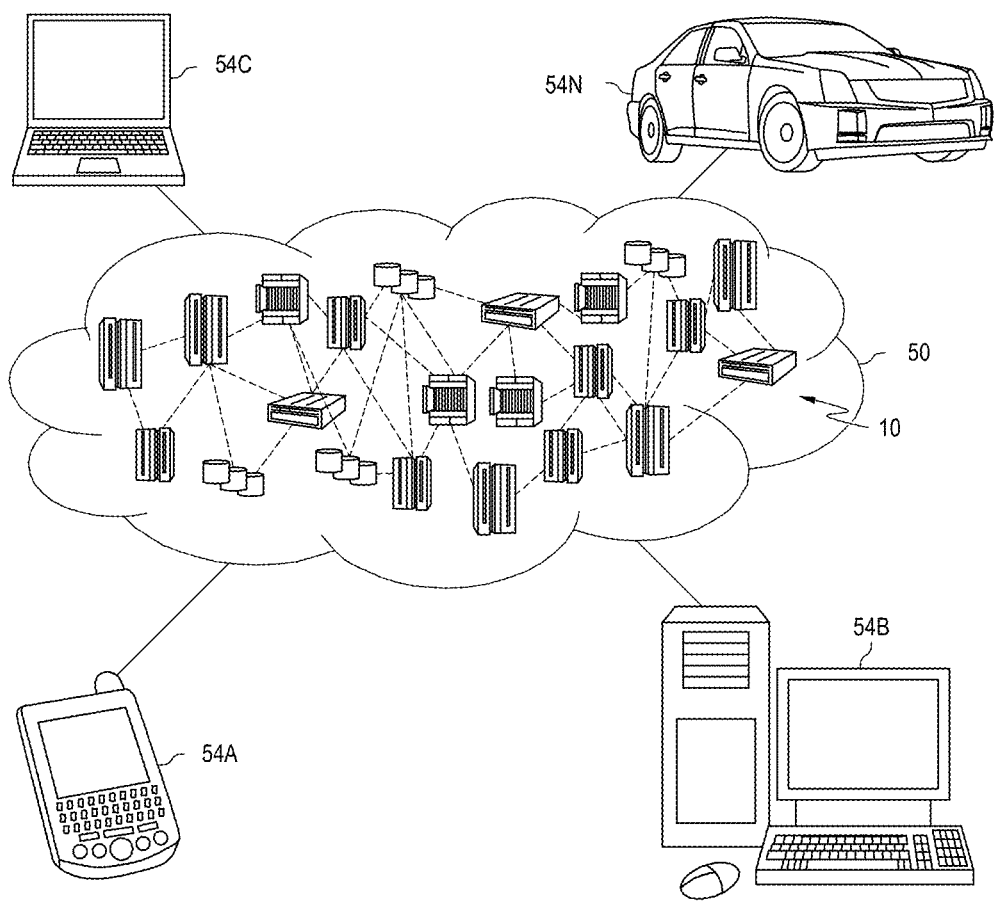
FIG. 1 illustrates a cloud environment according to some embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to reservation management systems, more particular aspects relate to reservation management when customers are distributed geographically and have different service request times. While the present disclosure is not necessarily limited to such applications, various aspects of the disclosure may be appreciated through a discussion of various examples using this context.

In recent years, smart phones have allowed more and more customers to access the Internet any time of day and from anywhere in a city. This phenomena may allow for taxi service, delivery/courier service, and package pickup service reservations to be made using smartphone applications. These smartphone applications, in turn, may allow for increased in the use of computerized reservation management systems (RMS), both for collecting reservation related information and for dispatch of the associated resources.

Some embodiments of this disclosure may allow customers to make reservations by designating definite time and place, and those reservations may be automatically transmitted to a terminal in the managed mobile assets (e.g., taxi, delivery vehicle, bus, etc.). Some embodiments of this disclosure may further allow for one or more of: (1) temporary reservations, in which a use (e.g., riding) probability relative to time is defined by a probability distribution; (2) support for a plurality of different probability distribution modes, including without limitation, "request for use around a certain time," "request for use before a certain time" and "request for use after a certain time"; (3) a two-stage reservation composed of an advanced temporary reservation and a subsequent definite reservation; and (4) matching of the mobile resource with the reservations based on a riding/delivery request probability and an assumed allocation/delivery completion time; and (5) and dispatch of the mobile resource(s) to pick-up location(s) in response to the matching.

For example, in some embodiments as applied to the illustrative example of a taxi dispatch RMS system, a customer may be able to request a temporary reservation and then choose between a "ride around a certain time" probability distribution mode, a "ride before a certain time" probability distribution mode, and a "ride after a certain time" probability distribution mode. The RMS in these embodiments may then calculate an arrival time for the resource (e.g., taxi dispatch completion time) for each of those who made a temporary reservation based on the inputted temporary reservation information of the customer. Then, the RMS may calculate a riding probability of each of those made a temporary reservation by using the input riding probability distribution with respect to the time designated by each of those who made the temporary reservation. Lastly, the allocation system may dispatch the mobile resource (e.g., taxi) based on a riding probability after completion of the current resource allocation. In some embodiments, when the desired time for the resource becomes definite, the customer may make an updated, definite reservation (e.g., requests an immediate taxi allocation). In response, the reservation/allocation system may then immediately dispatch the mobile resource (e.g., the taxi) to the customer to pick up the customer at the requested time and place.

In this way, customers can more easily cope with a flexible schedule change after the reservation is made. For example, there may be a case where the need for the service is clear, but time is unsettled within a certain range. In the case of a RMS applied to taxi dispatch, the customer may not be able to be on-schedule due to extended meeting or delayed catering of food and drink, even if a reservation is made with expected time. Similarly, the customer may be unable to predict waiting time of certain minutes for riding a taxi after making a reservation with a definite time, or may not be able to make a reservation due to no empty taxi. If it turns out that the customer has to wait to get a taxi for quite a while during making a reservation, the customer is bound by restricted time and place.

For operators, these embodiments may be desirable because the additional information may help them understand the demands and the behavioral characteristics of their customers, thereby reducing the chance of a loss in sales opportunity and/or a loss due to having to re-dispatch the mobile asset. For example, in the case of an "immediately use" reservation, because a sudden reservation is made, the operator is unable to predict a demand and plan how many and where empty taxies should be allocated or reserved. As a result, their resource use rate may be reduced due to the travel of an empty resource (e.g., taxi) to a scheduled riding point. Moreover, the customer may not actually be present at reserved time and place, and thus, that time may be wasted due to absence of the customer. And, as a result, sales opportunities for other customers may be lost or there may be redelivery. This may be particularly important for a RMS system that manages geographically distributed assets that have different service request times, such as taxi allocation or delivery, according to actual customer demands.

Yet another feature and advantage of some embodiments is that they may compensate for ambiguity of boarding time against the customer's boarding reservation time and errors of the dispatch time of the taxi to the requested location. For example, in the case of a RMS applied to taxi dispatch, customers using the reservation option according to the characteristics of the customers' events are free from the feeling that they 'have to wait' for the reserved taxi even if their actual schedule is a little different. From the operator's perspective, even if the time required for dispatching the vehicle deviates from the time required by the customer, a more appropriate fare option, i.e., a boarding proposal accompanied by a discount to the scheduled user, can be made in comparison with the conventional method based on the riding probability of the user. Similarly, some embodiments may be robust against inaccuracies of the customer's taxi request and the actual vehicle allocation time.

Cloud Computing

FIG. 1 illustrates a cloud environment consistent with some embodiments. It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active customer accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited customer-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
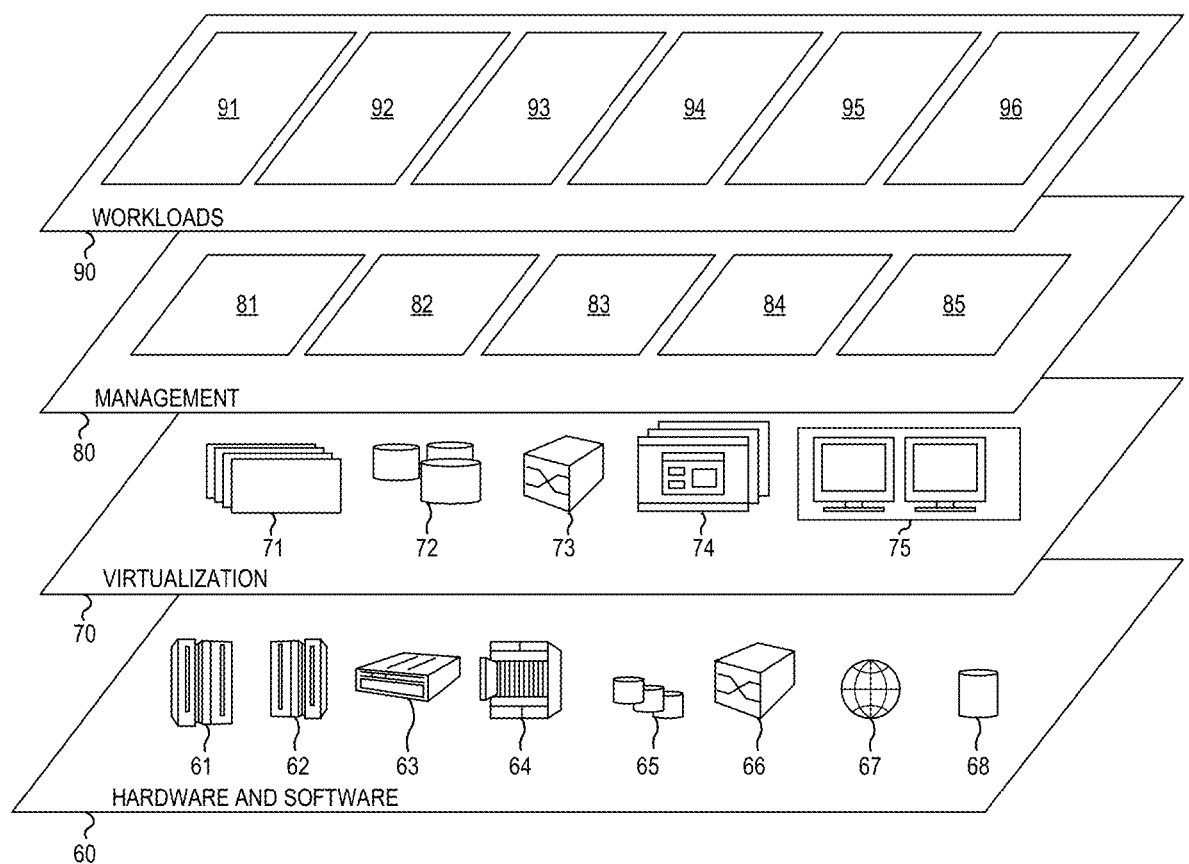
FIG. 2 illustrates a set of functional abstraction layers provided by a cloud computing environment according to some embodiments

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. Customer portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and RMS base unit 96.

Data Processing System

Figure 3:
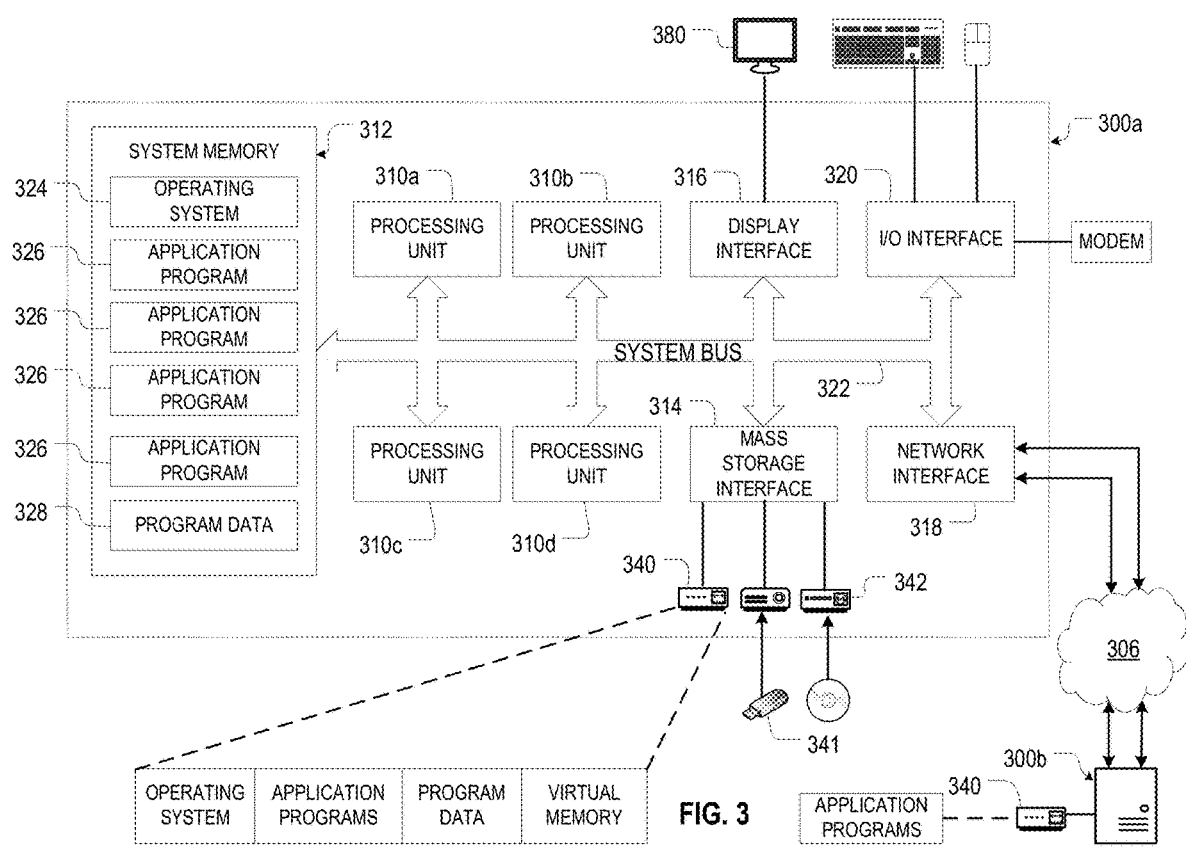
FIG. 3 illustrates an embodiment of a data processing system (DPS) suitable for use as a cloud computing node in a cloud computing environment, consistent with some embodiments.

FIG. 3 illustrates an embodiment of a data processing system (DPS) 300 suitable for use as a cloud computing node 10 in a cloud computing environment 50, consistent with some embodiments. In some embodiments, the DPS 300 is implemented as a personal computer; server computer; portable computer, such as a laptop or notebook computer, PDA (Personal Digital Assistant), tablet computer, or smart phone; processors embedded into a larger devices, such as an automobile, airplane, teleconferencing system, appliance; smart devices; or any other appropriate type of electronic device. Moreover, components other than or in addition to those shown in FIG. 3 may be present, and that the number, type, and configuration of such components may vary. Moreover, FIG. 3 only depicts the representative major components of the DPS 300, and individual components may have greater complexity than represented in FIG. 3.

The data processing system 300 in FIG. 3 comprises a plurality of central processing units 310 a-310 d (herein generically referred to as a processor 310 or a CPU 310) connected to a memory 312, a mass storage interface 314, a terminal/display interface 316, a network interface 318, and an input/output ("I/O") interface 320 by a system bus 322. The mass storage interface 314 in this embodiment connect the system bus 322 to one or more mass storage devices, such as a direct access storage device 340, universal serial bus ("USB") storage device 341, or a readable/writable optical disk drive 342. The network interfaces 318 allow the DPS 300 to communicate with other DPS 300 over the communications medium 306. The memory 312 also contains an operating system 324, a plurality of application programs 326, and program data 328.

The data processing system 300 embodiment in FIG. 3 is a general-purpose computing device. Accordingly, the processors 310 may be any device capable of executing program instructions stored in the memory 312 and may themselves be constructed from one or more microprocessors and/or integrated circuits. In this embodiment, the DPS 300 contains multiple processors and/or processing cores, as is typical of larger, more capable computer systems; however, in other embodiments the computing systems 300 may comprise a single processor system and/or a single processor designed to emulate a multiprocessor system. Further, the processors 310 may be implemented using a number of heterogeneous data processing systems 300 in which a main processor is present with secondary processors on a single chip. As another illustrative example, the processor 310 may be a symmetric multi-processor system containing multiple processors of the same type.

When the data processing system 300 starts up, the associated processor(s) 310 initially execute the program instructions that make up the operating system 324, which manages the physical and logical resources of the DPS 300. These resources include the memory 312, the mass storage interface 314, the terminal/display interface 316, the network interface 318, and the system bus 322. As with the processor(s) 310, some DPS 300 embodiments may utilize multiple system interfaces 314, 316, 318, 320, and busses 322, which in turn, may each include their own separate, fully programmed microprocessors.

Instructions for the operating system, applications and/or programs (generically referred to as "program code," "computer usable program code," or "computer readable program code") may be initially located in the mass storage devices 340, 341, 342, which are in communication with the processors 310 through the system bus 322. The program code in the different embodiments may be embodied on different physical or tangible computer readable media, such as the system memory 312 or the mass storage devices 340, 341, 342. In the illustrative example in FIG. 3, the instructions are stored in a functional form of persistent storage on the direct access storage device 340. These instructions are then loaded into the memory 312 for execution by the processor 310. However, the program code may also be located in a functional form on the computer readable media 342 that is selectively removable and may be loaded onto or transferred to the DPS 300 for execution by the processor 310.

The system bus 322 may be any device that facilitates communication between and among the processors 310; the memory 312; and the interfaces 314, 316, 318, 320. Moreover, although the system bus 322 in this embodiment is a relatively simple, single bus structure that provides a direct communication path among the system bus 322, other bus structures are consistent with the present disclosure, including without limitation, point-to-point links in hierarchical, star or web configurations, multiple hierarchical buses, parallel and redundant paths, etc.

The memory 312 and the mass storage devices 340, 341, 342 work cooperatively to store the operating system 324, the application programs 326, and the program data 328. In this embodiment, the memory 312 is a random-access semiconductor device capable of storing data and programs. Although FIG. 3 conceptually depicts that device as a single monolithic entity, the memory 312 in some embodiments may be a more complex arrangement, such as a hierarchy of caches and other memory devices. For example, the memory 312 may exist in multiple levels of caches, and these caches may be further divided by function, so that one cache holds instructions while another holds non-instruction data, which is used by the processor or processors. Memory 312 may be further distributed and associated with different processors 310 or sets of processors 310, as is known in any of various so-called non-uniform memory access (NUMA) computer architectures. Moreover, some embodiments may utilize virtual addressing mechanisms that allow the DPS 300 to behave as if it has access to a large, single storage entity instead of access to multiple, smaller storage entities such as the memory 312 and the mass storage device 340, 341, 342.

Although the operating system 324, the application programs 326, and the program data 328 are illustrated as being contained within the memory 312, some or all of them may be physically located on different computer systems and may be accessed remotely, e.g., via the communications medium 306, in some embodiments. Thus, while the operating system 324, the application programs 326, and the program data 328 are illustrated as being contained within the memory 312, these elements are not necessarily all completely contained in the same physical device at the same time and may even reside in the virtual memory of other DPS 300.

The system interfaces 314, 316, 318, 320 support communication with a variety of storage and I/O devices. The mass storage interface 314 supports the attachment of one or more mass storage devices 340, 341, 342, which are typically rotating magnetic disk drive storage devices, a solid-state storage device (SSD) that uses integrated circuit assemblies as memory to store data persistently, typically using flash memory, or a combination of the two. However, the mass storage devices 340, 341, 342 may also comprise other devices, including arrays of disk drives configured to appear as a single large storage device to a host (commonly called RAID arrays) and/or archival storage media, such as hard disk drives, tape (e.g., mini-DV), writeable compact disks (e.g., CD-R and CD-RW), digital versatile disks (e.g., DVD, DVD-R, DVD+R, DVD+RW, DVD-RAM), holography storage systems, blue laser disks, IBM Millipede devices, and the like.

The terminal/display interface 316 is used to directly connect one or more display units, such as monitor 380, to the data processing system 300. These display units 380 may be non-intelligent (i.e., dumb) terminals, such as an LED monitor, or may themselves be fully programmable workstations used to allow IT administrators and customers to communicate with the DPS 300. Note, however, that while the display interface 316 is provided to support communication with one or more display units 380, the computer systems 300 does not necessarily require a display unit 380 because all needed interaction with customers and other processes may occur via network interface 318.

The communications medium 306 may be any suitable network or combination of networks and may support any appropriate protocol suitable for communication of data and/or code to/from multiple DPS 300. Accordingly, the network interfaces 318 can be any device that facilitates such communication, regardless of whether the network connection is made using present day analog and/or digital techniques or via some networking mechanism of the future. Suitable communication media 306 include, but are not limited to, networks implemented using one or more of the "InfiniBand" or IEEE (Institute of Electrical and Electronics Engineers) 802.3x "Ethernet" specifications; cellular transmission networks; wireless networks implemented one of the IEEE 802.11x, IEEE 802.16, General Packet Radio Service ("GPRS"), FRS (Family Radio Service), or Bluetooth specifications; Ultra-Wide Band ("UWB") technology, such as that described in FCC 02-48; or the like. Those skilled in the art will appreciate that many different network and transport protocols can be used to implement the communications medium 306. The Transmission Control Protocol/Internet Protocol ("TCP/IP") suite contains suitable network and transport protocols.

Computerized Reservation Management System Base Unit

FIGS. 4A, 4B, 5A, and 5B illustrate the operation of a RMS base unit 96 according to some embodiments as applied to the illustrative example of taxi dispatch. While taxi dispatch will be used to illustrate aspects of the disclosure, some embodiments may be applied to a diverse range of applications, including without limitation, air travel, taxis, courier services, shipping services, rideshare matching programs, personalized rapid transit, car rental, rail travel, trailer rental, hotels, tours, and other activities. The two stage, probabilistic management system of this disclosure may even be applied to activities such as reserving computing resources in a data center. In these embodiments, a data center operator may use the probabilistic, temporary reservation to preemptively dispatch workloads to various physical computing units in anticipation of peak demand. The data center may then use the second, definite reservation to respond to on-demand orders, unanticipated load peeks, etc.

In this illustrative example, the RMS base unit 96 may be software executing on a DPS, such as DPS 300. A customer in this example may make a reservation with an ambiguity mode with respect to time of use of the resource using the GUI described in more detail with respect to FIG. 9. The ambiguity mode, in turn, corresponds to a use-of-service probability function that varies depending on the customer's desired mode of use of the resource. Some probability functions suitable for use with a taxi dispatch RMS system include: (i) "ride before a certain time," in which riding probability function increases to 100% at the designated time. This reservation case may be applied when, for example, a reservation of a fight or train for sightseeing or business trip is definite and taxi riding time is definite in order to catch the flight or train; (ii) "ride after a certain time," in which the probability function starts at 100% at the designated time and then gradually decays to 0%. This reservation case corresponds to a request for use of taxi after an event such as meeting or concert with finishing time determined to some extent; and (iii) "ride around a certain time," in which the probability function peaks around the designated time and decreases to approximately 0% both before and afterwards. This reservation case may be desirable where there is a clear necessity to use the taxi, but it is difficult to determine the exact time beforehand. Note, however, that other probability distribution functions are within the scope of this disclosure.

Figure 4A:
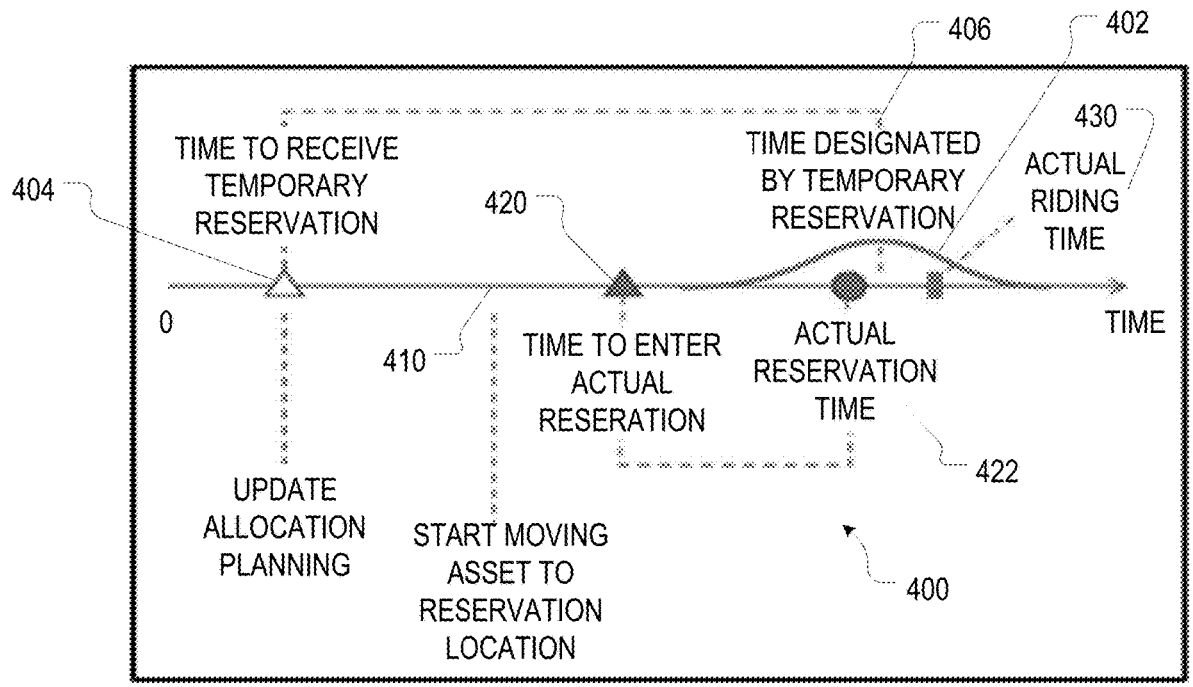
FIG. 4A illustrates an example timeline for a "ride around a certain time" option of a RMS base unit according to some embodiments, as applied to the illustrative example of taxi dispatch.

FIG. 4A illustrate an example timeline 400 for the "ride around a certain time" option. In this timeline, the customers' probability of schedule change before riding in a taxi is assumed to be based on a normal probability distribution 402. At time point 404, the customer may make a temporary reservation with the taxi company. The temporary reservation may include a temporary reservation time 406, a temporary location, and an ambiguity mode (in this example, the "ride around a certain time" mode). The ambiguity mode may have an associated probability function 402. In some embodiments, this temporary reservation information may be input using the mobile application described in more detail with reference to FIG. 9. Also at time point 404, the taxi company may update their mobile asset allocation plan in response to the new, temporary reservation. That is, the taxi company may preliminarily match one or more of their taxis to the temporary reservation.

Next, at time point 410, the RMS base unit 96 for the taxi company may begin dispatching one or more of the taxis generally toward the temporary location received at time point 404 in anticipation of future use. In some embodiments, taxi dispatches and customer reservations may not be matched one-to-one. Instead, these embodiments may optimize the placement of an operational fleet of taxis based on the geographical location of the entire book of customer reservations at that time. For example, if the number of taxis is less than the number of customers who want to take the taxi, instead of simply dispatching the taxi to the customer who wants to take the taxi with the highest expectation, the taxi may be dispatched to the middle point between the customers who want to take the taxi and the customers who want to take the taxi.

In some embodiments, one or more of the taxis may continue to accept additional rides, particularly if short and/or lucrative. In some embodiments, if a particular taxi moves away from the temporary location due to one of those additional rides, the RMS base unit 96 may respond by dispatching one or more replacements taxis in the managed fleet generally toward the reservation location. Because the temporary reservation is not for a definite time, a probability of the customer arriving at said time fluctuates along the probability function 402.

At time point 420, the customer may convert the temporary reservation into an actual (i.e., definite) reservation. This actual reservation may have an associated actual reservation time 422 and an actual location that differs from the original temporary reservation time 406 and temporary location. In some embodiments, this actual reservation information may be input using the mobile application described in more detail with reference to FIG. 9.

At time point 430, the customer may arrive at the actual reservation location. In some cases, time point 430 may differ from both the temporary reservation time 406 and the actual reservation time 422. This event may cause the RMS base unit 96 to signal to one of the managed taxis to stop and pick up the customer. In some cases, the RMS base unit 96 may transmit identifying information (e.g., pictures, license plate information) to one or both of the customer and the driver of the taxi.

Figure 4B:
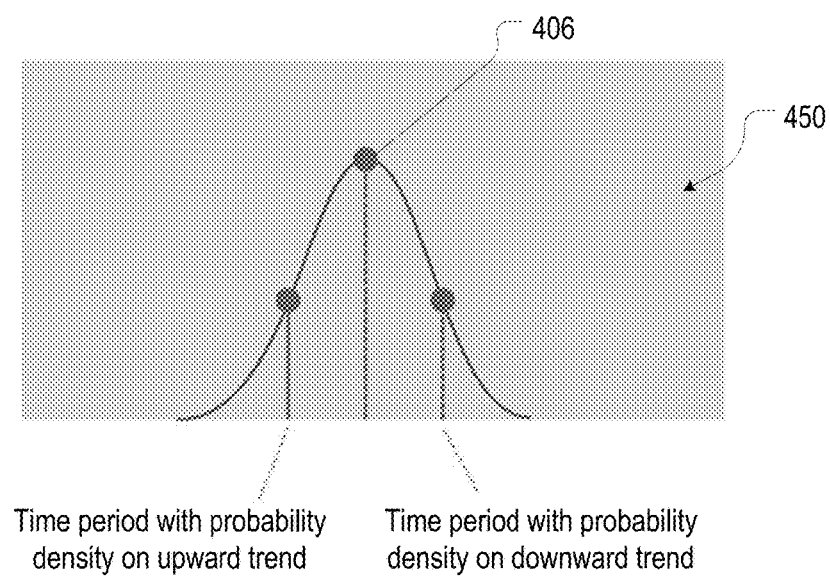
FIG. 4B illustrates an example ride probability function for a "ride around a certain time" option of a RMS base unit according to some embodiments, as applied to the illustrative example of taxi dispatch.

FIG. 4B illustrates a ride probability function 450 for the "ride around a certain time" option. In some embodiments, the probability of schedule change before riding in a taxi (or, from the customer's point of view, the time the customer can get into the taxi) may be assumed to be based on a probability distribution in which the mean is set to the temporary reservation time 406 and the variance is set to a default. In this ride probability function 450, the probability density is on an upward trend before the reservation time 406 and on a downward trend after the reservation time 406. This ride probability function 450 may correspond to a situation the likelihood of travel delays if a customer is arriving by plane or train before taking a taxi. Similarly, if a customer holds an event (e.g., meetings and tourist attractions) before taking a taxi, it may correspond to the time when the event ends and the customer can take a taxi, not when the customer arrives geographically.

In some embodiments, parameters for this normal ride probability distribution 450 may be adjusted according to the customer's past timeliness performance (e.g., the variance may be greater and smaller, and/or the mean shifted from the temporary reservation time), or even another probability function used. In these embodiments, for the first-time customer, the probability distribution may be based on default value for the parameters that may be applied, and then updated over time based on the customer's actual usage history.

One feature and advantage of these embodiments is that the RMS base unit 96 can respond to the prediction of the customer's first boarding or the prediction at a travel destination where data is small and/or where there is no existing customer behavior pattern. That is, in these embodiments, the boarding probability may be calculated by the probability function linked to the easily selectable pattern determined by the customer at the time of advance reservation, and efficient vehicle dispatch is performed in advance.

Advantageously, the customer in these embodiments knows they are guaranteed a taxi ride, and therefore, feels confident toward delivery of the service. The customer is also freed from guilt about keeping a taxi waiting if their schedule is slightly advanced or delayed. From the operator's perspective, taxi allocation based on a probability distribution is more efficient because it reduces the risk of the taxi waiting empty if it arrives earlier than the peak time, and because it reduces the risk of keeping the passenger waiting for a later arrival than the peak time. That is, in the absence of this system, taxi dispatch may be conducted in advance based on the knowledge of taxi companies and drivers in the past (e.g., a taxi pool in front of a station or a large event hall may be used). In these cases, in the case where the number of cars to be dispatched is greater than the number of passengers, there would be a waste of otherwise productive time waiting for the customer due to the difference between the actual opportunity for the customer to get in the car and the dispatch of the car. Additionally, some embodiments may be desirable because the dispatch is based on an input of a customer's prospect of getting a ride, and not based on dispatch where a taxi makes a customer wait.

Some embodiments may also ensure passenger pickup even if taxi arrival deviates from the peak time. That is, in comparison with a reservation based on a fixed scheduled time for boarding, vehicle allocation in some embodiments may be performed based on the riding characteristics (e.g., the probability of occurrence) of the user. Therefore, the customer can make it clear whether there is a possibility of getting on the train if it is later than the scheduled dispatch time, and whether there is a possibility of getting on the train if it arrives earlier than the scheduled dispatch time, so that opportunity loss can be prevented.

Figure 5A:
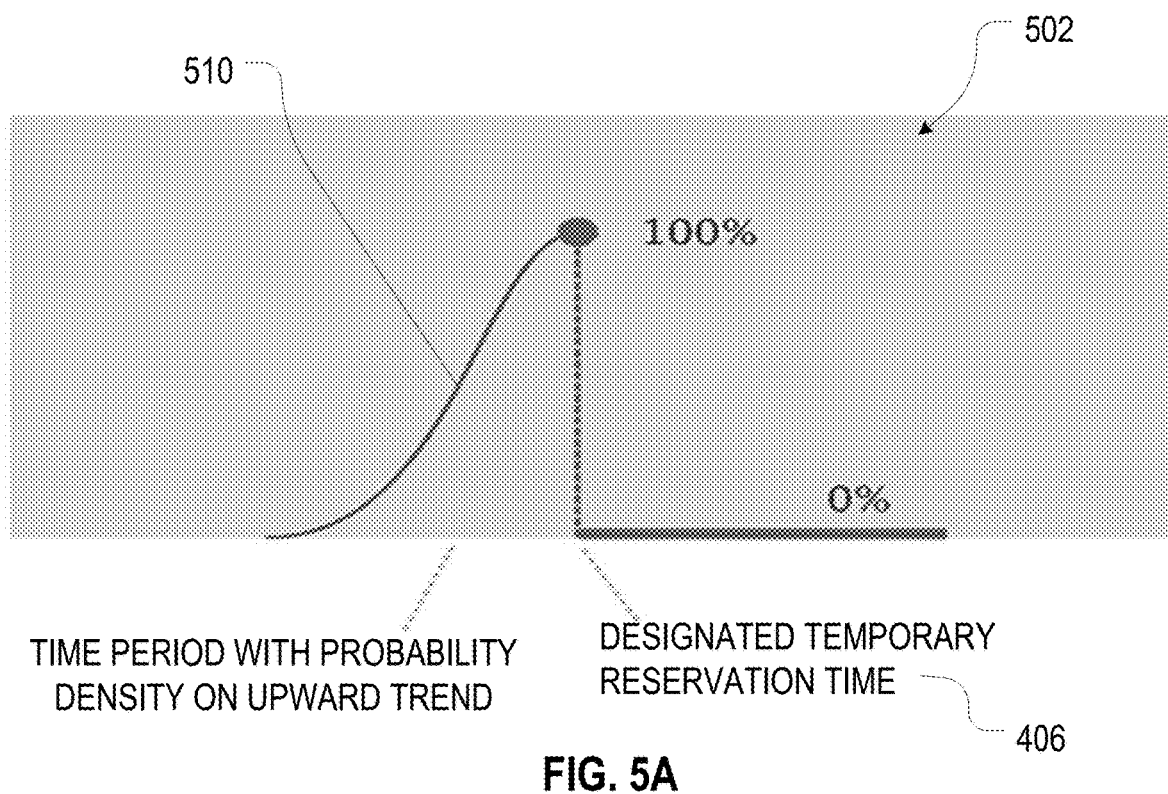
FIG. 5A illustrates an example ride probability function for a "ride before a certain time" option of a RMS base unit according to some embodiments, as applied to the illustrative example of taxi dispatch.

FIG. 5A illustrates the "ride before a certain time" option 502 in more detail. In this reservation case, the customer does not wish to ride after a scheduled time. The associated ride probability function 510 may be assumed to be based on a curve in which temporary reservation time 406 may be set to 100%. In this probability function 510, the probability density is on an upward trend before the temporary reservation time 406 and zero after the temporary reservation time 406. This function 510 may correspond to a situation where the customer intends to make sure they are riding in a taxi before the scheduled time and therefore expects that a taxi is certainly allocated before that time. However, the time at which the customer wishes to ride actually varies according to a probability distribution. The customer knows they can will be able ride in a taxi and therefore feels safe. In some embodiments, parameters for the probability distribution curve may be updated based on the customer's actual usage history. From the operators' perspective, in the "ride before a certain time" option, taxi allocation according to a probability distribution is most efficient to the operator. Taxi allocation at certain time beyond the scheduled time causes a reduction in customer satisfaction. When a taxi arrives earlier than assumed time, it is possible to propose a ride with a discount to the intended customer.

Figure 5B:
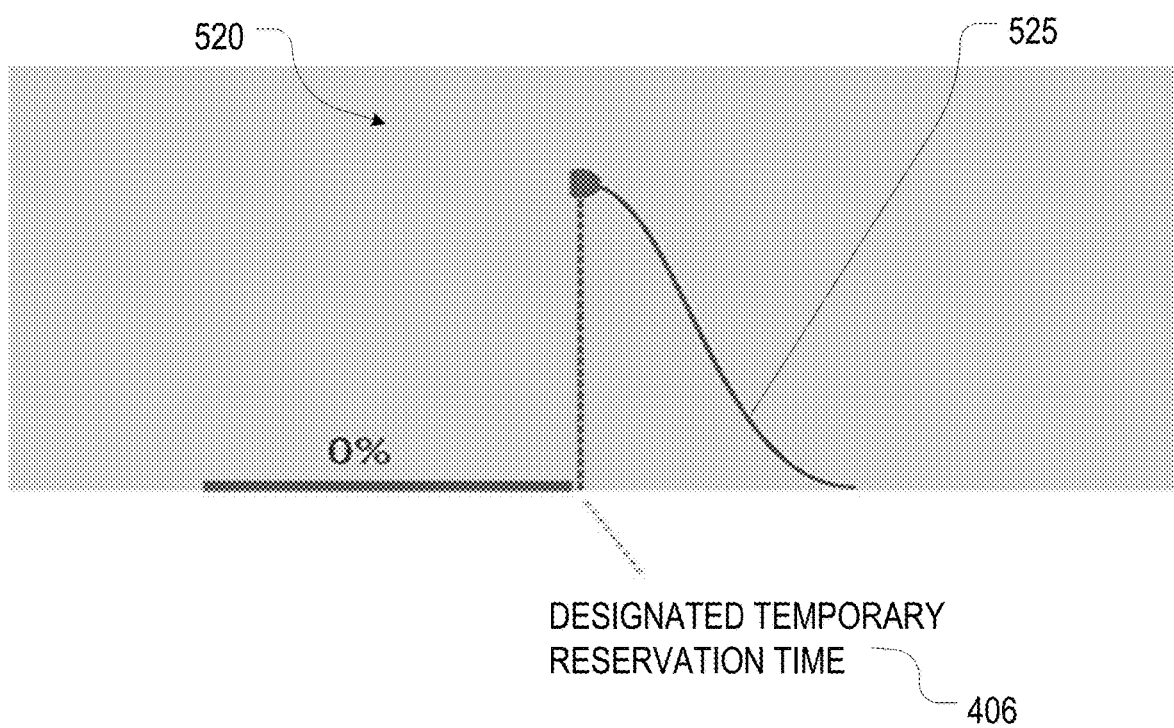
FIG. 5B illustrates an example ride probability function for a "ride after a certain time" option of a RMS base unit according to some embodiments, as applied to the illustrative example of taxi dispatch.

FIG. 5B illustrates the "ride after a certain time" option 520 and associated change probability function 525 in more detail. In this reservation case, the customer requests the managed asset after an event, such as a meeting and a concert in which the ending time is determined to some extent. In these use cases, the customer may be reasonably certain that they will need a ride after a certain time, and very unlikely to need one before the scheduled temporary time. The associated probability distribution function 525 of schedule change before riding in a taxi may be assumed to be based on a probability density at its peak at scheduled time and having a gradual decrease from that peak over some time period. In some embodiments, parameters for the start and slope of the probability distribution function 525 may be updated based on the customer's actual usage history.

From the operator's perspective, taxi allocation according to this probability distribution 525 may be efficient because there is assumed to be no possibility of the customer riding in a taxi even if a taxi is allocated before scheduled time. If the taxi allocation is completed after the predicted time and before the definite reservation by the customer, it is possible to propose a ride with a discount to the intended customer.

Turning now to another illustrative RMS example, a courier delivery service or cleaning pickup service. In some embodiments applied to this use case, a request for use "before certain time" may be desirable, in which the customer requests the courier to come for delivery or pickup before the designated time. The request probability becomes 0% at the designated time. This reservation case is applicable when the customer requests the courier to come (for delivery or pickup) before an event in which a time for the customer to come to work or a time before going out is determined. From the customer's perspective, the customer does not request a visit after the scheduled time. This may be desirable because the customer intends to make sure a visit before the reservation time and the customer expects that an allocation is ensured before said time. The visit, in turn, may be characterized by being highly likely to happen in a time period after the start of designated time. From the operator's perspective, courier allocation according to a probability distribution may be more efficient. Allocation at certain times beyond the scheduled time leads to 'revisits' and causes reduction in customer satisfaction.

In operation, a reservation management input menu and a data configuration may be substantially the same as those of the taxi reservation management system described with reference to FIG. 9. A courier allocation plan may be the same as the case of development to taxi operators in terms of calculating and planning a probability distribution of request for use by the customer. The courier route may be determined based on a use request probability at the time at which each courier truck arrives at a location of each of those who made a request for use (future time).

Similarly, a request for use "after certain time" probability function may be used to accommodate customer requests the courier to come (for delivery or pickup) at designated time after returning home. The request for use may be assumed to be based on a probability distribution in which earlier time than designated time has higher values and the value gradually decreases along with the elapse of time. Previous request probability becomes 0% at the designated time. The probability of a request for a visit before the reservation time is low due to absence of the customer.

From the customer's perspective, this reservation case corresponds to a customer's request for use of service after returning home. In this case, they are confident that use after certain time will happens. From the operator's perspective, courier allocation according to a probability distribution is most efficient to the operator as there is possibility of the customer staying at home even if allocation is made before scheduled time.

Figure 6:
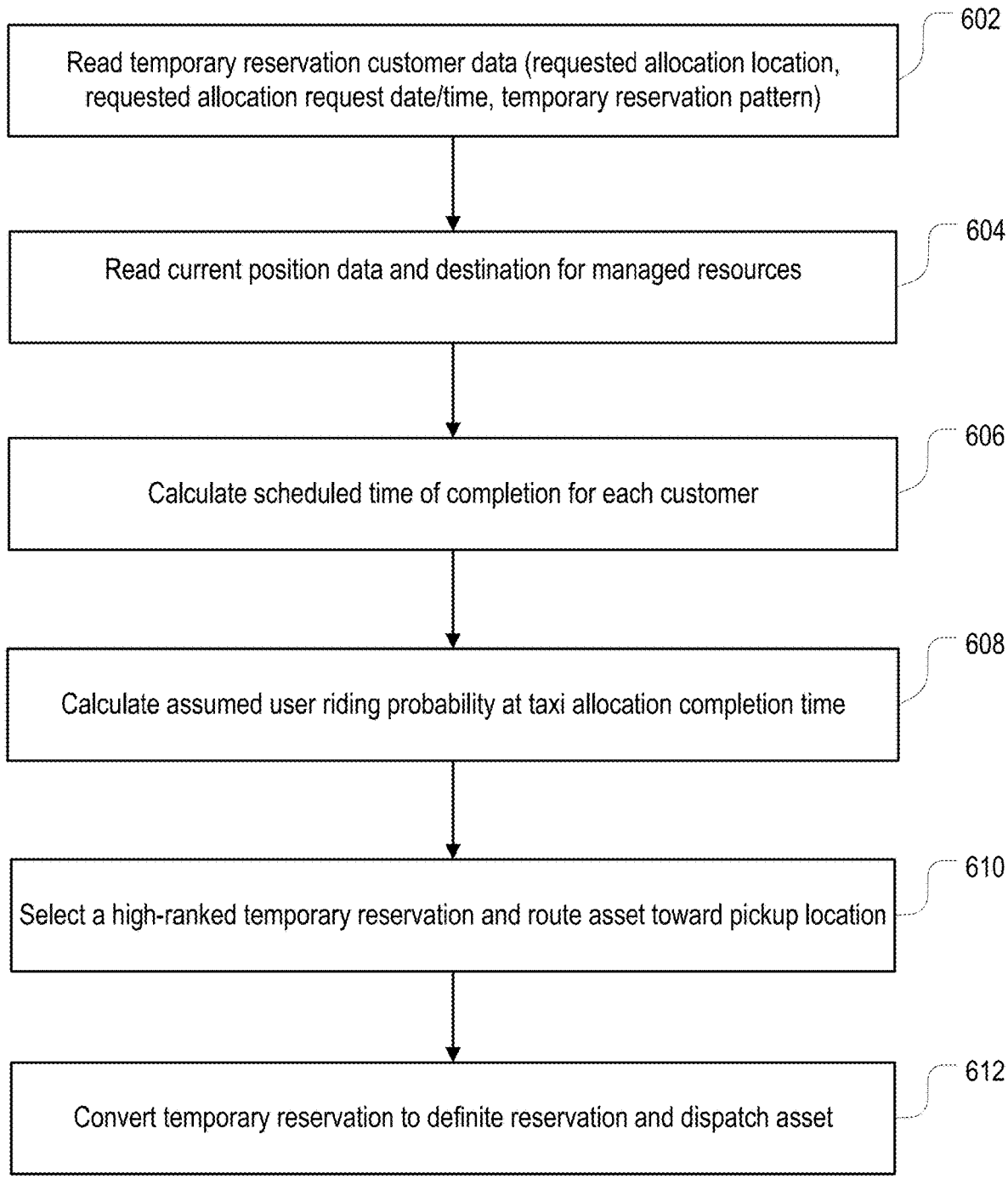
FIG. 6 illustrates a flowchart for one method for processing reservations, as applied to the illustrative example of a taxi reservation and taxi allocation RMS, consistent with some embodiments.

FIG. 6 illustrates a flowchart for one method for processing reservations, as applied to the illustrative example of a taxi reservation and taxi allocation RMS, consistent with some embodiments. At operation 602, the RMS base unit 96 receives a temporary reservation from a customer indicating their desire to use a taxi at some future time and place. In addition, the RMS base unit 96 also receives a reservation ambiguity, such as "ride around a certain time," "ride before a certain time" and "ride after a certain time" according to the mode of necessity of riding. In response, the RMS base unit 96 reads and/or requests the current positions and current destinations for all of its managed resources at operation 604 and then calculates an arrival time of the managed asset (e.g., current taxi allocation completion time) for each of those who made a temporary reservation based on inputted temporary reservation information of the customer at operation 606. Next, the system calculates a riding probability of each of those who made a temporary reservation by using a riding probability distribution associated with the reservation ambiguities and using the requested times received at operation 608. This probability may include both the customers' riding probabilities and the current taxis' operational patterns. The RMS base unit 96 matches taxis with reservations, and then dispatches (i.e., transmits a pick-up time and location to) one or more taxis based on the matching at operation 610.

If and when the riding time becomes definite, the customer may make a definite reservation (i.e., requests an immediate taxi allocation) using the mobile application described with reference to FIG. 9. In response, the reservation/allocation system may immediately dispatch a taxi to the customer to pick up the customer at operation 612. In this way, from a customer's perspective, when a plan to ride in a taxi is initially formulated, the customer may make a "temporary reservation" by specifying time, place, and a probability distribution. When time to ride in a taxi becomes definite, the customer makes a "definite reservation/taxi allocation request. From the operator's perspective, when the temporary reservation is received, the operator may begin to update its taxi allocation plan according to designated time, place, and probability distribution. When a definite reservation/taxi allocation request is received, the operator moves a taxi to a final definite point.

In some embodiments, even if the customer initially makes a definite reservation, the RMS base unit 96 may calculate the reservation using an assumed completion time, place, and probability distribution. For example, some RMS embodiments may model definite reservations as an "around this time" reservation with a low variance and mean at the reserved time. In some embodiments, the assumed riding probability may be calculated from historic data regarding probability distribution relevant to the riding probability according to assumed riding time and a temporary reservation option pattern of that particular customer. For example, the probability of getting on a train at the assumed travel time is 100%, but the probability of getting on a train at a different time may be calculated based on the travel probability pattern used for the reservation and the corrected probability distribution based on the customer's history. If, for a particular customer, the variance of the probability distribution becomes large if the customer gets on a train at a time different from the time requested by the assumed probability of getting on the train in the past.

In some embodiments, advanced grouping may also be made based on a distance between the taxi and the customer for reduction of calculation amount, not based on all the combinations of the customer who made a temporary reservation and the taxi. That is, when the number of customers (N) and the number of taxis (M) are large, the pattern to be calculated increases exponentially, and the calculation amount may become enormous. Therefore, in order to reduce the calculation amount of taxi dispatching, the customer (N) and the number of taxis dispatching (M) may be divided and grouped by geographical dispersion at the time of calculation. For example, N is divided into N1 and N2. Thus, M is divided into M1 and M2. Thus, the number of calculation patterns required for vehicle allocation can be reduced by making the taxi group M1 for the customer group N1 and the taxi group M2 for the customer group N2.

Example of Resource Allocation and Use Probability Calculation

One case example provided below for calculating a use probability according to a reservation option pattern of "ride around a certain time," again using taxi allocation as an illustrative example. Selection of probability distribution and a calculation method, however, is not limited to this case example. In this case example the probability calculation formula may be described as follows.

Premises

The probability distribution follows the standard normal distribution.

The standardized taxi dispatching time is calculated by the following equation.

Standardized taxi dispatch time duration=(Distance between the scheduled taxi and the destination customer/standard travel speed of Taxi)/Standard taxi allocation time Customer's riding probability=Constant for defining maximum probability×Probability function ((Assumed taxi allocation time)×Riding time standardizing coefficient×constant for probability distribution)

where:

| Value | Explanation |
| --- | --- |
| Constant for defining maximum probability | Value given according to reservation option pattern. A value with maximum probability of '1.0' is given when "ride before a certain time" option is selected. |
| Riding time standardizing coefficient | Coefficient or given value to standardize difference between assumed taxi allocation time and temporary reservation riding scheduled time. |
| Constant for probability distribution | Give value for providing variations in probability distribution. Corresponds to standard deviation in normal distribution. Given value. |

Other options, such as "ride before a certain time" and "ride from a certain time," may further require adding an appropriate conditional expression in this calculation.

As applied to the illustrative example of a taxi using the "ride around a certain time" distribution, the calculation becomes:

$$1 \times (1/\sqrt{2\pi}) \exp((-\text{Standardized taxi allocation time duration})^2/2)$$

Continuing the taxi allocation illustrative example, the above calculation may be further reduced with the following premises:

Premises

Distance between the scheduled taxi and the destination customer: 5 Km standard travel speed of Taxi: 60 Km/h Standard taxi allocation duration:10 min (⅙ hours)

$$\text{Customer's riding probability} = 1 \times (1/\sqrt{2\pi}) \exp((-((5/60)/(1/6))^2/2) \approx 0.35$$

FIGS. 7 and 8 are simulations of the results of some embodiments of this disclosure, again using taxis as an illustrative example. In these simulations:

Simulation is made for two taxies and four customers.

Initial positions of taxies and customers are given randomly.

Area is a square with each side of unit=1.0 for simplification.

Taxi allocation speed is defined as "1.0"

Initial use probability of each customer is given randomly

Timing of definite reservation of each customer is given randomly.

Customers A and B make a temporary reservation under the "ride before a certain time" probability distribution, whereas customers C and D make a temporary reservation under the "ride after a certain time" probability distribution (linear functions are used as functions to change reservation probabilities for simplification).

In a first simulation pattern, taxis are allocated according to the combination having a short allocation distance between a taxi position (initial position) and final riding customers. Positions of two taxies and four customers are fixed randomly. Two taxies and two final riding customers are combined so as to have a short allocation distance in total. Total allocation distance is calculated.

In a second simulation pattern, when a temporary reservation is received, advanced allocation of two taxies is made for two customers having high initial riding probabilities in the temporary reservation. In this second simulation pattern, customers and taxi allocation are combined to have a short distance in total.

1. Positions of two taxies and four customers are fixed randomly.
2. Two customers having high initial riding probabilities are selected as target customers of taxi allocation.
3. Two taxies and taxi allocation for two customers of high-ranked probabilities in the temporary reservation are combined so as to have a short allocation distance in total.
4. Advanced taxi allocation is performed.
5. Two Customer made final definite reservation.
6. Two taxies and taxi allocation for the two final riding customers are combined so as to have a short allocation distance in total. Advanced allocated taxi locations are defined at timing when final definite reservations are made.
7. Total allocation distance is calculated.

In a third simulation pattern, taxis are dispatched according to probability distribution and multiple stage reservation method (advanced taxi allocation pattern according to riding probability at completion of taxi allocation). More specifically, when a temporary reservation is received, taxies are allocated to customers having high riding probabilities at the future point at which advanced taxi allocation is completed. In this simulation pattern, customers and taxi allocation are combined to have a short distance in total:

1. Positions of two taxies and four customers are fixed randomly.
2. When a temporary reservation is received, two customers having high riding probabilities at the future point at which advanced taxi allocation is completed are selected as target customers of taxi allocation.
3. Two taxies and taxi allocation for two customers of high-ranked probabilities in the temporary reservation are combined so as to have a short allocation distance in total.
4. Advanced taxi allocation is performed.
5. Two customers who made a final definite reservation are determined at random time
6. Two taxies and taxi allocation for two final riding customers are combined so as to have a short allocation distance in total. Advanced allocated taxi locations are defined at timing when final definite reservations are made.
7. Total allocation distance is calculated.

FIG. 7 illustrates the results of a taxi reservation system according to probability distribution and multiple stage reservation method, specifically comparison between existing taxi allocation pattern #1 and taxi allocation pattern #2 based on initial riding probability. Left figure shows a level obtained by 100 attempts to improve (shorten) the taxi allocation distance when taxi allocation is made based on the initial riding probability in the case without existing advanced taxi allocation. Owing to the advanced taxi allocation according to the initial riding probability in temporary reservation, it is estimated that the allocation distance can be made shorter to the value of 70%.

FIG. 8 illustrates the results of simulation result of taxi reservation system according to probability distribution and multiple stage reservation method. Comparison between taxi allocation pattern #2 based on initial riding probability and pattern #3 (advanced taxi allocation pattern according to riding probability at completion of taxi allocation). FIG. 8 shows a level obtained by 100 attempts to improve (shorten) the taxi allocation distance according to a riding probability at completion of taxi allocation with respect to the taxi allocation based on the initial riding probability. Owing to the taxi allocation by the riding probability at completion of taxi allocation, it is assumed that the allocation distance can be made shorter to the value of 65% with respect to the taxi allocation based on the initial riding probability of 42% in comparison with the case without advanced taxi allocation.

Computerized Reservation Management Client

Figure 9:
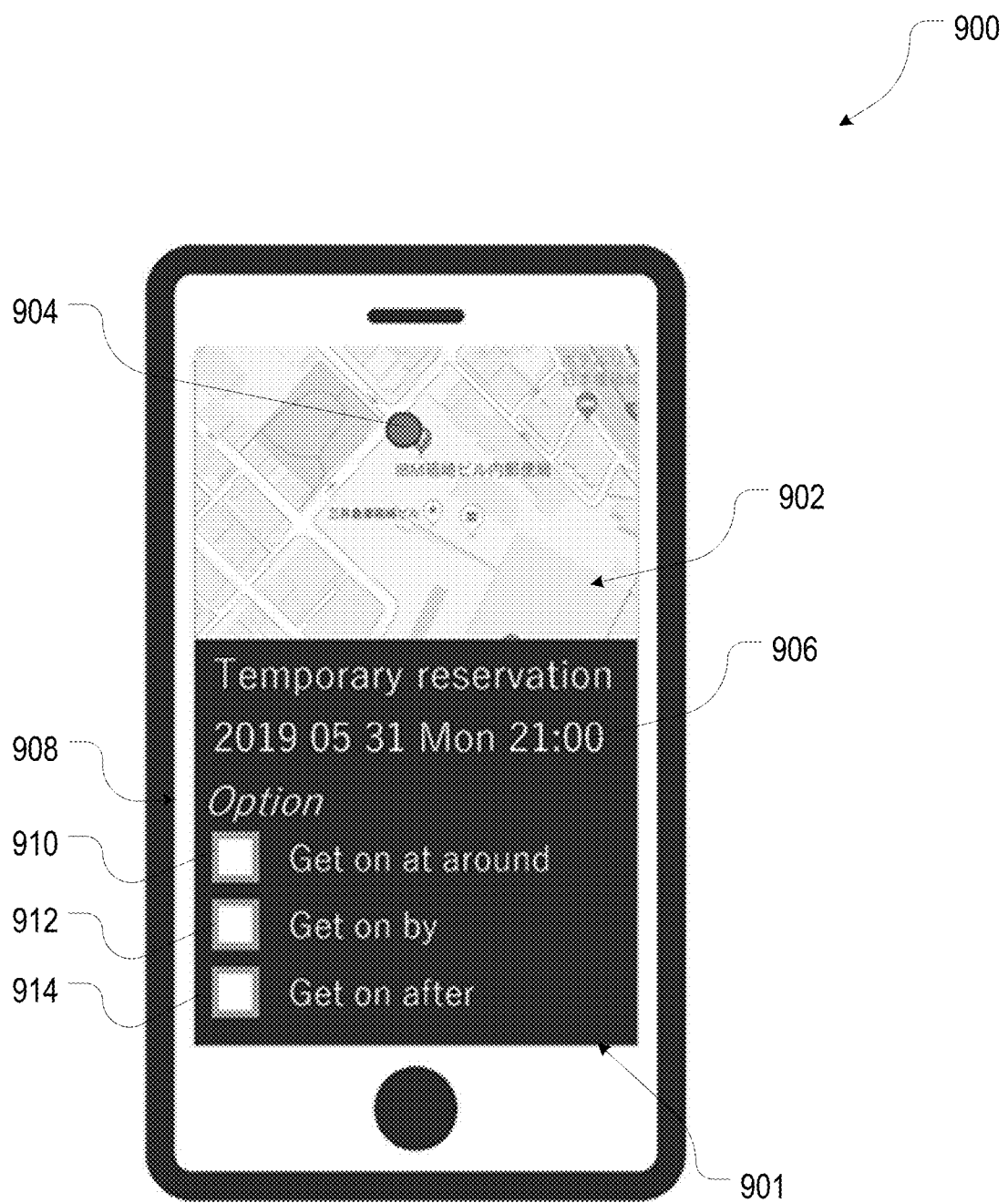
FIG. 9 illustrates an example a graphical customer interface (GUI) consistent with some embodiments.

FIG. 9 illustrates an example a graphical customer interface (GUI) 900 consistent with some embodiments. This GUI 900 may be part of a software application 901 designed for use on mobile computing device in some embodiments. In other embodiments, it may be integrated into a web application accessed via a web browser and delivered via a cloud environment, such as cloud environment 50. The GUI 900 may comprise a map panel 902 showing a desired location for the reservation 904, a desired time for the reservation 906, and an ambiguity menu 908. The temporary reservation menu 908 may provide options to allow designation of a use pattern request with ambiguity in addition to normal designation of time and place. As illustrated, this embodiment provides an option 910 to use the resource approximately at the selected base time, an option 912 to use the resource at or before the selected base time, and an option to use the resource at or after the selected base time 914. Some embodiments may further provide menus and/or panels (not shown) to designate a desired time range with ambiguity or a peak riding probability as further options. Additionally, some embodiments may also provide additional GUI screens and/or panels (not shown) to allow the customer to enter contact details and payment method information.

Computer Program Product

Although the present invention has been described in detail with reference to certain examples thereof, it may be also embodied in other specific forms without departing from the essential spirit or attributes thereof. For example, the present invention may be a system, a method, and/or a computer program product at any possible technical detail level of integration. The computer program product may include a computer readable storage medium (or media) having computer readable program instructions thereon for causing a processor to carry out aspects of the present invention. The computer readable program instructions can be stored and executed on a single computer or divided amongst different computers, at the same location or different locations, for storage and execution.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the customer's computer, partly on the customer's computer, as a stand-alone software package, partly on the customer's computer and partly on a remote computer or entirely on the remote computer or server. In the latter scenario, the remote computer may be connected to the customer's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

General

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Aspects of the present invention were described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. Moreover, the flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Any particular program nomenclature used in this description was merely for convenience, and thus the invention should not be limited to use solely in any specific application identified and/or implied by such nomenclature. Thus, for example, the routines executed to implement the embodiments of the invention, whether implemented as part of an operating system or a specific application, component, program, module, object, or sequence of instructions could have been referred to as a "program", "application", "server", or other meaningful nomenclature. Indeed, other alternative hardware and/or software environments may be used without departing from the scope of the invention.

Therefore, it is desired that the embodiments described herein be considered in all respects as illustrative, not restrictive, and that reference be made to the appended claims for determining the scope of the invention.

What is claimed is:

1. A computer-implemented scheduling method, comprising:
acquiring a plurality of temporary reservations from a plurality of customers for a plurality of mobile resources, wherein each of the plurality of temporary reservations comprise a customer-selected temporary service time, temporary pickup location, and ambiguity mode for the temporary service time, wherein:
the ambiguity modes comprise one or more of: (i) a request to use one of the plurality of mobile resources around the temporary service time, in which an associated riding probability function peaks around the temporary service time and decreases to approximately 0% both before and afterwards, (ii) a request to use one of the plurality of mobile resources before the temporary service time in which the associated riding probability function gradually increases from approximately 0% to 100% at the temporary service time, and (iii) a request to use one of plurality of mobile resources after the temporary service time, in which the associated riding probability function starts at 100% at the temporary service time and then gradually decays; and
the acquiring includes:
presenting a plurality of ambiguity modes for selection by one customer of the plurality of customers; and
receiving, from the one customer of the plurality of customers, a selected one of the plurality of ambiguity modes;
calculating a resource usage probability function for each customer of the plurality of customers using the customer-selected temporary service times and the customer-selected ambiguity modes associated with the plurality of temporary reservations;

matching a first customer of the plurality of customers with a first mobile resource of the plurality of mobile resources based on the calculated resource usage probability functions; and dispatching the first mobile resource of the plurality of mobile resources toward the temporary pickup location in response to the matching;

after dispatching the first mobile resource of the plurality of mobile resources toward the temporary pickup location in response to the matching:

acquiring a definite reservation from the first customer of the plurality of customers, wherein the definite reservation requests an immediate allocation of one of the plurality of mobile resources at a definite pickup location; and dispatching a second mobile resource of the plurality of mobile resources to the definite pickup location in response to the definite reservation.

2. The computer-implemented method of claim 1, wherein the plurality of mobile resources are taxis, and wherein the plurality of customers are taxi riders.

3. The computer-implemented method of claim 1, further comprising:

acquiring a usage history for the one customer of the plurality of customers; and calculating a plurality of parameters for the resource usage probability function using the usage history.

4. A computer-implemented scheduling method, comprising:

acquiring a plurality of temporary reservations from a plurality of customers for a plurality of mobile resources, wherein each of the plurality of temporary reservations comprise a customer-selected temporary service time, temporary pickup location, and ambiguity mode for the temporary service time, wherein:

the ambiguity modes comprise one or more of: (i) a request to use one of the plurality of mobile resources around the temporary service time, in which an associated riding probability function peaks around the temporary service time and decreases to approximately 0% both before and afterwards, (ii) a request to use one of the plurality of mobile resources before the temporary service time in which the associated riding probability function gradually increases from approximately 0% to 100% at the temporary service time, and (iii) a request to use one of plurality of mobile resources after the temporary service time, in which the associated riding probability function starts at 100% at the temporary service time and then gradually decays; and the acquiring includes:

presenting a plurality of ambiguity modes for selection by one customer of the plurality of customers; and receiving, from the one customer of the plurality of customers, a selected one of the plurality of ambiguity modes;

calculating a resource usage probability function for each customer of the plurality of customers using the customer-selected temporary service times and the customer-selected ambiguity modes associated with the plurality of temporary reservations;

acquiring a current location and a current destination from each of the plurality of mobile resources;

calculating a predicted completion time for each of the plurality of mobile resources based on the current location and the current destination;

matching a first customer of the plurality of customers with a first mobile resource of the plurality of mobile resources based on the calculated resource usage probability functions, wherein matching the plurality of customers with the plurality of mobile resources is further based on the predicted completion times; and dispatching the first mobile resource of the plurality of mobile resources toward the temporary pickup location in response to the matching;

after dispatching the first mobile resource of the plurality of mobile resources toward the temporary pickup location in response to the matching:

acquiring a definite reservation from the first customer of the plurality of customers, wherein the definite reservation requests an immediate allocation of one of the plurality of mobile resources at a definite pickup location; and dispatching a second mobile resource of the plurality of mobile resources to the definite pickup location in response to the definite reservation.

5. The computer-implemented method of claim 4, wherein the dispatching of the first mobile resource of the plurality of mobile resources toward the temporary pickup location in response to the matching comprises:

dispatching the first mobile resource of the plurality of mobile resources to a middle point between two or more customers of the plurality of customers.

6. The computer-implemented method of claim 4, wherein:

the current time is different than the temporary service time; and the temporary pickup location is different than the definite pickup location.

7. A base unit for a reservation management system, comprising a processor coupled to a memory, the memory containing program instructions that, when executed on the processor, cause the base unit to:

acquire a plurality of temporary reservations from a plurality of customers for a plurality of mobile resources, wherein each of the plurality of temporary reservations comprise a customer-selected temporary service time, temporary pickup location, and ambiguity mode for the temporary service time, wherein:

the ambiguity modes comprise one or more of: (i) a request to use one of the plurality of mobile resources around the temporary service time, in which an associated riding probability function peaks around the temporary service time and decreases to approximately 0% both before and afterwards, (ii) a request to use one of the plurality of mobile resources before the temporary service time in which the associated riding probability function gradually increases from approximately 0% to 100% at the temporary service time, and (iii) a request to use one of plurality of mobile resources after the temporary service time, in which the associated riding probability function starts at 100% at the temporary service time and then gradually decays; and the acquiring includes:

presenting a plurality of ambiguity modes for selection by one customer of the plurality of customers; and receiving, from the one customer of the plurality of customers, a selected one of the plurality of ambiguity modes;

calculate a resource usage probability function for each customer of the plurality of customers using the customer-selected temporary service times and the customer-selected ambiguity modes associated with the plurality of temporary reservations;

acquire a current location and a current destination from each of the plurality of mobile resources;

calculate a predicted completion time for each of the plurality of mobile resources based on the current location and the current destination;

match a first customer of the plurality of customers with a first mobile resource of the plurality of mobile resources based on the calculated resource usage probability functions, wherein matching the plurality of customers with the plurality of mobile resources is further based on the predicted completion times; and dispatch the first mobile resource of the plurality of mobile resources toward the temporary pickup location in response to the matching;

after dispatching the first mobile resource of the plurality of mobile resources toward the temporary pickup location in response to the matching:

acquire a definite reservation from the first customer of the plurality of customers, wherein the definite reservation requests an immediate allocation of one of the plurality of mobile resources at a definite pickup location; and dispatch a second mobile resource of the plurality of mobile resources to the definite pickup location in response to the definite reservation.

8. The base unit of claim 7 wherein the plurality of mobile resources comprises a plurality of taxis.

9. The base unit of claim 7, further comprising program instructions that, when executed on the processor:

acquire a usage history for the one customer of the plurality of customers;

calculate a plurality of parameters for the resource usage probability function using the usage history.

* * * * *